(No Model.)
H. TUTTLE.
GRAIN ADJUSTER.
No. 326,464. Patented Sept. 15, 1885.
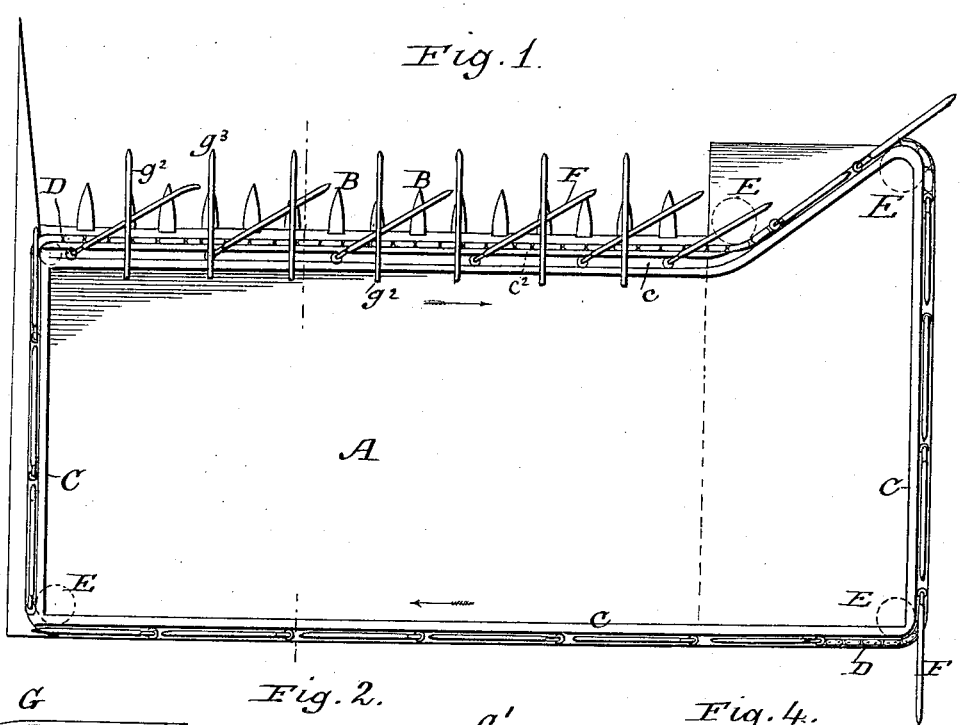
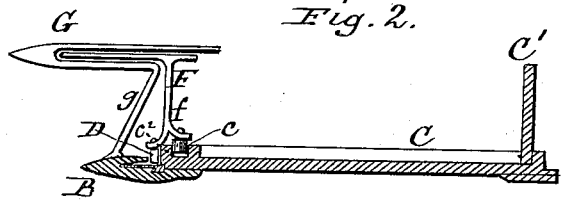
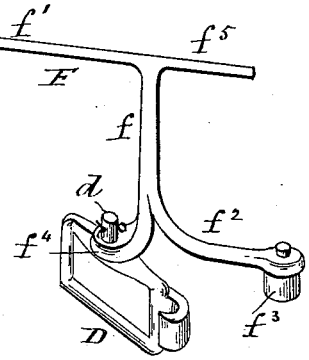
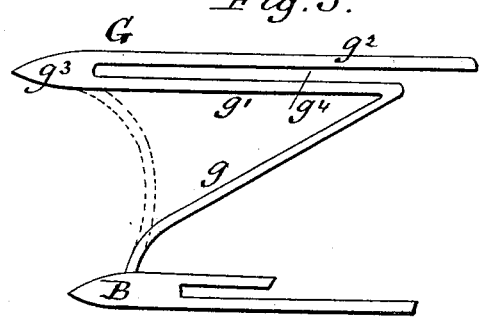
Witnesses:
L. C. Hills
W. B. Masson
Inventor
Hosmer Tuttle
by E. E. Masson
atty.

UNITED STATES PATENT OFFICE.

HOSMER TUTTLE, OF CEDAR RAPIDS, IOWA.

GRAIN-ADJUSTER.

SPECIFICATION forming part of Letters Patent No. 326,464, dated September 15, 1885.

Application filed March 10, 1884. (No model.)

*To all whom it may concern:*

Be known that I, HOSMER TUTTLE, a citizen of the United States, residing at Cedar Rapids, in the county of Linn and State of Iowa, have invented certain new and useful Improvements in Grain-Adjusters, of which the following is a specification, reference being had therein to the accompanying drawings, in which—

Figure 1 is a plan of the platform of a reaper or harvester provided with my improved grain-detaching mechanism. Fig. 2 is a vertical transverse section taken on the line $x$ $x$, Fig. 1. Fig. 3 is a side elevation of one of the guard-fingers for the cutter and grain-adjuster mechanism. Fig. 4 is a perspective of one of my movable fingers or grain-adjusters, and a link of the adjuster carrying chain detached.

Like letters refer to like parts in all the figures.

The object of my invention is to provide means for delivering cut grain upon the platform of a reaper or harvester, whereby the necessity of using the well-known reel is obviated and a more perfect distribution of the cut grain upon the platform is secured, in that its delivery and progress thereon will be such that the straws will lie substantially parallel with each other, and the butts are advanced uniformly with the heads along the platform by the usual endless carrier. It is well known that there are several objections to the use of an overhung reel upon well-ripened grain—first, a tendency to beat out from the heads considerable of the grain, causing a waste thereof, and also that the rotary motion of the reel-blades force applied to the upper part of the grain either produces entanglement thereof or its delivery beyond the rear of the platform, and occasionally a portion of the butts projects into the standing grain, and thus prevents a uniform feeding of the cut grain along the platform, and additional means are required to adjust an overhung reel for the purpose of adapting it to operate in tall or low grain. By my invention I employ the force necessary to deliver it upon the platform at or near the butt of the grain, or at such a distance therefrom that the force applied is exerted to direct the grain upon the carrier in substantially parallel lines, and to prevent the butts of the cut straws from projecting into the standing grain.

Other objects and advantages of my invention will appear in the following description of the same, and the novel features thereof will be specifically set forth in the claims.

A represents the platform of a reaper or harvester, which may or may not be provided with any usual devices for transporting the grain along it to any suitable collecting or elevating devices, directing it to a second platform or to a grain-binding apparatus.

B represents the fingers of the cutting mechanism, which may be of any desired construction.

C represents a vertical rib projecting upward completely around the edges of the platform.

$c$ represents a groove, which is formed between two ribs, C and $C^2$, which are arranged parallel with and immediately in the rear of and completely across the cutting mechanism.

D represents an endless chain, which, by the pulleys E, is guided or held in contact with the rib C. Any number of the pulleys E, arranged inside of or outside of the ribs, as necessary, may be employed, in accordance with the general outline of any platform or the desired directions in which it may be necessary to conduct or direct the endless chain. Certain links of the said chain are provided with lugs $d$, in this instance projecting vertically from the upper side of the link.

F represents one of my adjusters proper, and it comprises a post, $f$, having a horizontally-projecting arm, $f'$, at its top, and an arm, $f^2$, arranged to project in a direction opposite to that in which the front end of the arm $f'$ projects, and arranged at or near the base of the post. Said arm $f^2$ is provided with a depending lug or anti-friction roller, $f^3$, made to travel within the groove $c$. Opposite the arm $f^2$ the post $f$ is curved or formed into a base or foot, $f^4$, for the reception of the lug $d$. I also in this instance provide another arm, $f^5$, which is simply an extension of the arm $f'$.

My adjuster may be made of cast or wrought metal in one or several pieces, may be changed in configuration and in the disposition and proportion of its arms, and in many other particulars to any extent and in any manner which will suggest themselves to persons skilled in the construction of devices of this character; and I therefore do not desire to be understood as limiting my invention to the exact details of the adjuster and the manner of its connection with the link of an endless chain, which is herein shown and set forth.

As thus far described, it will be seen that so long as the depending lugs or anti-friction rollers $f^3$ are left free to move in any direction while the endless chain is in motion they will remain in substantially the same vertical plane which the chain occupies when going in a direct line, and that when one of the pulleys E at the corner of the platform or any curve or change of direction in the rib C they will project outwardly or tangentially to the direction taken by the chain in any curve, and that when a direct line is again assumed by the chain the adjuster will again follow in line therewith. Taking advantage of these principles of the operation, I employ the means described—namely, the groove $c$—to cause the adjuster to assume a position when over the cutting apparatus which shall adapt them to force the cut grain upon the platform during the entire passage of the adjuster along over the cutting mechanism. This function is secured by locating the groove $c$ back of the endless chain, and such a distance back of the same as shall present the adjuster at a suitable angle to the fingers of the cutter-bar. The farther back said groove is located the more obtuse will be the angle of presentation, and the nearer to the chain the groove is located the more acute the angle of presentation of the adjuster.

To render the operation of the adjuster more satisfactory, I provide guards G, which are secured to the fingers B in any suitable manner, and comprise a standard, as $g$, which may be inclined to the rear and extended to the front, as at $g'$, and there joined to the parallel rod or arm $g^2$, so as to form a point, $g^3$, or, as shown by dotted lines, the standard may be curved to the front and immediately joined at the point $g^3$. In the former construction a slot, $g^4$, is formed through each guard G. In the latter construction the arm $f'$ of the adjuster simply passes under the arm $g^2$ and over the cutting mechanism. The functions of the guards G are to enter the standing grain in advance of the fingers B, and to form a resisting surface by means of the arms $g^2$ against the lateral movement of the grain, in consequence of the pressure of the adjuster-fingers against the same, so that the proper direction of the grain is secured, and it is gradually drawn and deposited upon the platform. The arm $f^5$ of the adjuster here appears to an advantage as well as the post $f$ of the same, in that the diagonal force is continued until the grain is completely delivered upon the platform, and the butts themselves are carried along with the adjusters upon the platform until taken up by the carrier usually employed.

I do not limit myself to either form of guard described, nor, as above indicated, to any form of guard elevated above the cutting apparatus; but I may, when using such guards, vary their construction in detail in any manner and to any extent, provided they are adapted to co-operate with my adjuster, substantially in the manner hereinbefore set forth.

Having described my invention, what I claim, and desire to secure by Letters Patent, is—

1. In combination with the platform of a reaper or harvester and with the cutting apparatus thereof, a series of diagonally-presented grain-adjuster fingers, and means for moving the same along and above said cutting apparatus, substantially as specified.

2. In combination with the cutting apparatus of a reaper or harvester, an endless chain provided with diagonally-disposed grain-adjuster fingers, and means for moving said chain along over and in line with said cutting apparatus, substantially as specified.

3. A grain-adjuster comprising a standard adapted to be connected with an endless chain, and provided with oppositely-disposed projecting arms, the lower one of which is provided with a depending lug, with or without an anti-friction-roller, substantially as specified.

4. The combination, with the cutting apparatus of a reaper or a harvester, of a series of grain-adjuster fingers, an endless chain carrying the same, and a series of guards arranged to co-operate with the adjuster-fingers, substantially as specified.

5. The combination of a platform of a reaper or harvester, a rib extending about the same, a second rib arranged parallel with the cutting apparatus to form a groove, an endless chain, guiding-pulleys, and grain-adjuster fingers mounted on the chain, and having an arm provided with a depending lug adapted to ride in the groove, substantially as specified.

6. A guard for a grain-adjuster comprising a standard and a horizontal arm, joined to each other and mounted upon the cutting apparatus, substantially as specified.

7. A guard, G, having the horizontal arm $g^2$, the arm $g'$ parallel thereto, and the standard $g$, substantially as shown and described.

8. The grain-adjuster consisting of the post $f$, having the front and rear arms, $f'$ $f^5$, at its top, the rear arm, $f^2$, at or near its bottom, provided with an anti-friction roller, $f^3$, and the base $f^4$, substantially as shown and described.

In testimony whereof I affix my signature in presence of two witnesses.

HOSMER TUTTLE.

Witnesses:
I. N. WHITTAM,
E. H. MEYERS.